United States Patent [19]
Ogawa et al.

[11] Patent Number: 5,668,793
[45] Date of Patent: Sep. 16, 1997

[54] DISK CARTRIDGE DRIVING APPARATUS

[75] Inventors: Takashi Ogawa, Yokohama; Masaaki Sofue, Hadano; Hideo Inuzuka, Yokohama, all of Japan

[73] Assignee: Ricoh Company, Ltd., Tokyo, Japan

[21] Appl. No.: 656,550

[22] Filed: May 31, 1996

Related U.S. Application Data

[63] Continuation of Ser. No. 186,779, Jan. 26, 1994, abandoned.

[30] Foreign Application Priority Data

Jan. 26, 1993 [JP] Japan ................. 5-010973

[51] Int. Cl.$^6$ ............................................. G11B 33/14
[52] U.S. Cl. ................. 369/77.2; 360/97.02; 369/75.1
[58] Field of Search ...................... 369/75.1, 75.2, 369/77.1, 77.2, 292; 360/97.02, 97.04, 99.02, 99.06

[56] References Cited

U.S. PATENT DOCUMENTS

| | | | |
|---|---|---|---|
| 5,255,256 | 10/1993 | Engler et al. | 369/77.2 |
| 5,301,179 | 4/1994 | Okamoto | 369/77.2 |
| 5,335,217 | 8/1994 | Kaneda et al. | 369/77.2 |

FOREIGN PATENT DOCUMENTS

| | | | |
|---|---|---|---|
| 52-73710 | 6/1977 | Japan | 369/77.2 |
| 3-113742 | 5/1991 | Japan | 369/75.1 |

Primary Examiner—Stuart S. Levy
Assistant Examiner—William J. Klimowicz
Attorney, Agent, or Firm—Cooper & Dunham LLP

[57] ABSTRACT

A disk cartridge driving apparatus contains a loading mechanism for loading a cartridge or cassette case inserted through an opening and a spindle motor, optical head, optical head driving mechanism for recording and reproducing data from a disk in the cartridge or cassette case. The spindle motor, optical head and optical head driving mechanism are flexibly sealed to prevent the entry of dust even when a disk cartridge is being loaded into the apparatus.

13 Claims, 6 Drawing Sheets

DISK CARTRIDGE DRIVING APPARATUS

FIELD OF THE INVENTION

This is a continuation of application Ser. No. 08/186,779 filed Jan. 26, 1994, now abandoned.

This invention relates to a cartridge driving apparatus loading therein and unloading therefrom a disk cartridge having a recording disk therein so as to record and reproduce data.

BACKGROUND OF THE INVENTION

In the example of a disk cartridge driving apparatus discussed in Japanese Patent Laid-open No. HEI 3-173989, there is an opening through which a cassette containing a disk can be inserted. Inside the apparatus, there is a spindle motor rotating the disk in the cartridge, an optical head focusing a laser beam onto the disk for recording and reproducing data, a driving mechanism driving the optical head, and a loading mechanism. The driving mechanism is sealed with the dust protection cover. The dust protection cover can provide an opening to allow the insertion of the cartridge, covered by a door which is opened and closed responding to loading/ejecting the cartridge (or cassette case).

However, the seal is such that the head accessing device inside the disk drive cannot always be protected from dust when a disk cartridge is being loaded. In the process of recording and reproducing data, the disk may be rotated at a high speed which can cause a high speed air stream in the apparatus which in turn can cause dust to enter the apparatus.

When dust enters and reaches optical parts in the head accessing device, there can be mis-reading or mis-writing of data on the disk because the dust reflects or absorb laser beams used in the recording/reproducing of the data.

SUMMARY OF THE INVENTION

It is therefore an object of the present invention to provide a disk cartridge driving apparatus in which a head accessing device protects the disk from dust when the disk cartridge is loaded therein.

According to a preferred embodiment of the invention, a disk cartridge driving apparatus comprises a partitioning member positioned on the midpoint between a chassis and an inserting opening of the apparatus in a sealing space formed by the chassis and the chassis cover. This makes it possible to restrain the diffusion of air into the chassis from the inserting opening.

According to the preferred embodiment of the invention, the partitioning member is an elastic member, one side of which is attached to the holder or the chassis cover and the opposite one of the partitioning member is in resilient contact with the other part of the chassis cover or the holder. This makes it possible to have an airtight contact with the chassis cover or holder without having to ensure proper measurement of the partitioning member and to have a larger range of movement for the partitioning member.

According to a preferred embodiment of the invention a convex portion is formed in the holder or chassis cover and a portion of the partitioning member is in resilient contact with the convex portion. This makes it possible to restrain the partitioning member to deform locally at the fixed position and to equalize the resilient formulation of the partitioning member.

According to a preferred embodiment of the invention, the partitioning member is in contact with cams positioning the holder at the loading position and is moved in response to rotation of the cams. This makes it possible to have contact with the holder or the chassis cover even after there is deterioration in the resilience of the partitioning member.

According to a preferred embodiment of the invention, the partitioning member has a reinforcing member which absorbs contact with the cams. This makes it possible to distribute the force of the cams to the partitioning member more equally.

According to a preferred embodiment of the invention, the partitioning member is electrically charged and the holder and chassis cover are insulated. This makes it possible to use static electricity to attract dust in the air to the partitioning member.

Other objects and features of the preferred embodiment of this invention will become understood from the following detailed description with reference to the accompanying drawings.

BRIEF DESCRIPTION OF THE DRAWINGS

The preferred embodiments of a disk cartridge driving apparatus according to the present invention will next be described in detail with reference to the accompanying drawings.

DETAILED DESCRIPTION OF THE PREFERRED EMBODIMENTS

Figure 1:
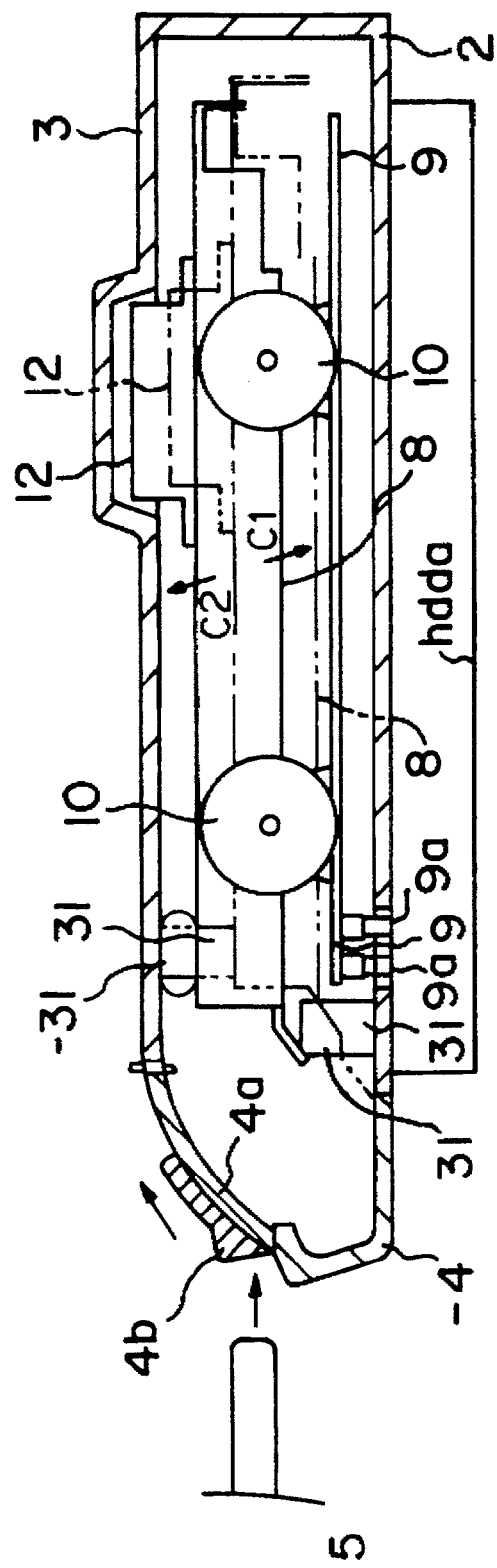
FIG. 1 is a side view of a disk cartridge driving apparatus in a first embodiment of the invention.
Figure 2:
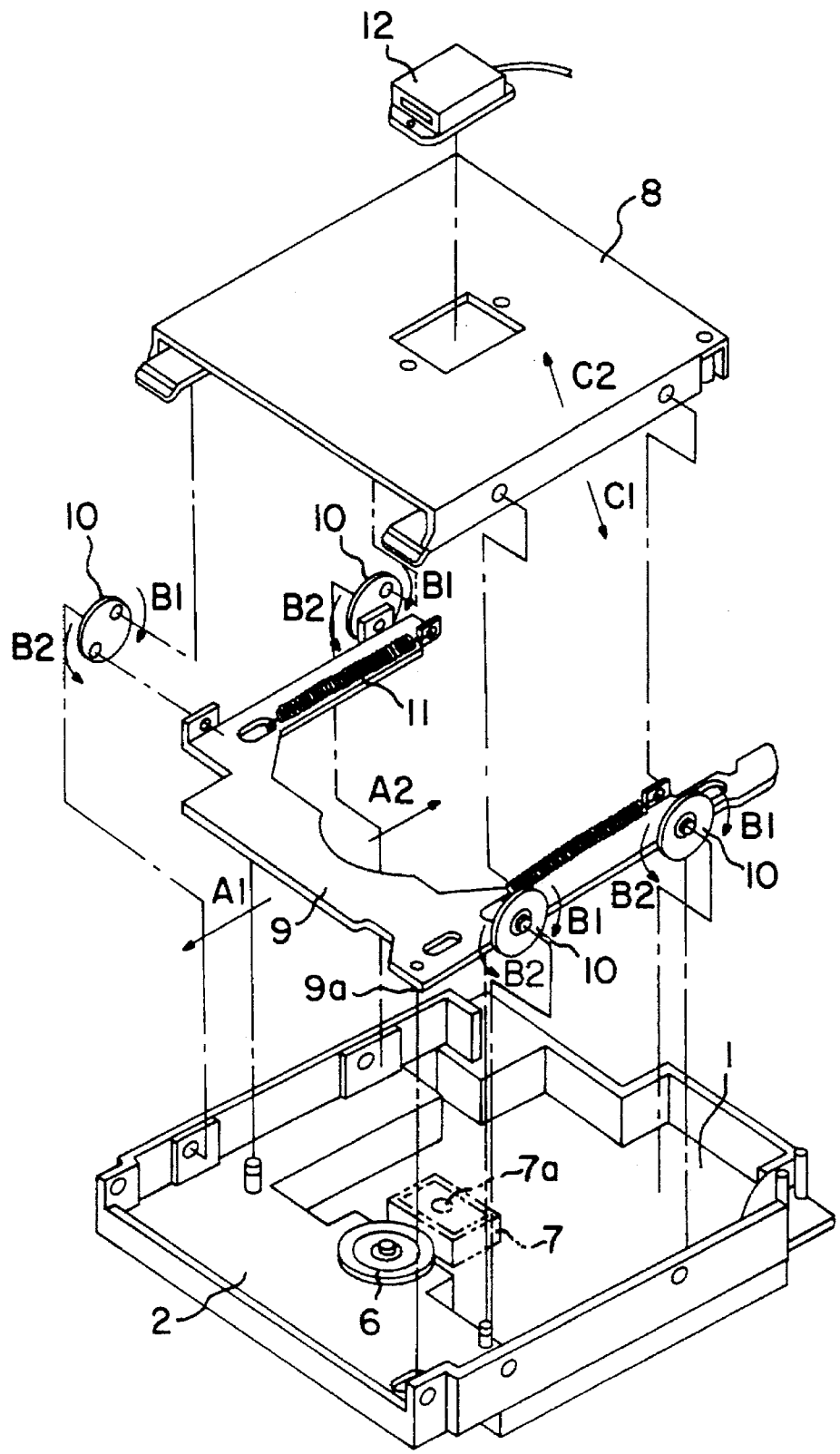
FIG. 2 is an exploded perspective view of the disk cartridge driving apparatus according to the first embodiment.

A first embodiment of the invention will be described in detail with reference to the drawings. FIG. 1 is a side view of a disk cartridge driving apparatus in a first embodiment of the present invention. FIG. 2 is an exploded perspective view of a loading mechanism of the disk cartridge driving apparatus.

The chassis cover for sealing the disk cartridge in the apparatus is formed from chassis 1, loading base 2, upper cover 3, and front cover 4. Front cover 4 has an inserting opening 4a for inserting a disk cartridge 5 therethrough. Opening and shutting of dust protecting door 4b, mounted over insertion opening 4a, is linked with the insertion and ejection of disk cartridge 5. When the dust protecting door 4b is positioned in the shut position shown in FIG. 1, it covers the insertion opening 4a and completely seals the space inside.

A spindle motor 6 for rotating the disk (not shown) in disk cartridge 5, an optical head 7 for positioning and focusing a laser beam on the disk, and a driving mechanism (not shown) for driving the optical head 7 are mounted on chassis 1. A cartridge holder holding disk cartridge 5 after it is inserted, a carrier reciprocating in the direction of insertion and ejection of disk cartridge 5, cams 10 for moving cartridge holder 8 to the loading position, and a loading motor unit (not shown) engaging with a loading pin 9a located on the under surface of carrier 9 are mounted on loading base 2. Carrier 9 is connected to loading base 2 and biased in the direction A1 by the resilient force of springs 11 connected to pins 13 of loading base 2.

When the loading motor unit is driven, carrier 9 is transported in the direction A2 against the resilient force of springs 11. Accordingly, carrier 9 rotates cams 10 in the counterclockwise direction B2 and moves cartridge holder 8 upward into a position for loading of the cartridge by a hooking mechanism (not shown). Cartridge holder 8 also contains a magnetic head 12 and a shutter (not shown) as an open/close mechanism for disk cartridge 5.

When a disk cartridge is to be inserted, cartridge holder 8 is positioned in the loading position shown by the solid lines in FIG. 1, the shutter of cartridge holder 8 is opened and the hooking mechanism is released. After the disk cartridge is inserted, carrier 9 moves in direction A1 and rotates cams 10 in direction B1. Cartridge holder 8 holding the disk cartridge moves downward in direction C1 and is positioned in the playing position shown by the dashed lines in FIG. 1. When in the playing position, optical head 7 can position and focus a laser beam through lens 7a to record and reproduce data on the disk.

When a disk cartridge is to be ejected, the loading motor unit is driven by an external signal to lift cartridge holder 8 to, and keep it in, the loading position. When cartridge holder 8 reaches the loading position, the disk cartridge is ejected out of the apparatus.

A first partition member 31 is attached to upper cover 3 of the chassis and to cartridge holder 8. A second partition member 31 is attached to loading base 2 and to cartridge holder 8. The partition members are made of elastic and flexible material such as a sponge, and is wider than cartridge holder 8. The ends of partition members 31 are always in resilient contact with cartridge holder 8 and expanded or compressed in conjunction with the transportation of cartridge holder 8 in directions C1 and C2. In this embodiment, partition members 31 seal the space between cartridge holder 8 and upper cover 3 and between cartridge holder 8 and loading base 2.

Figure 3:
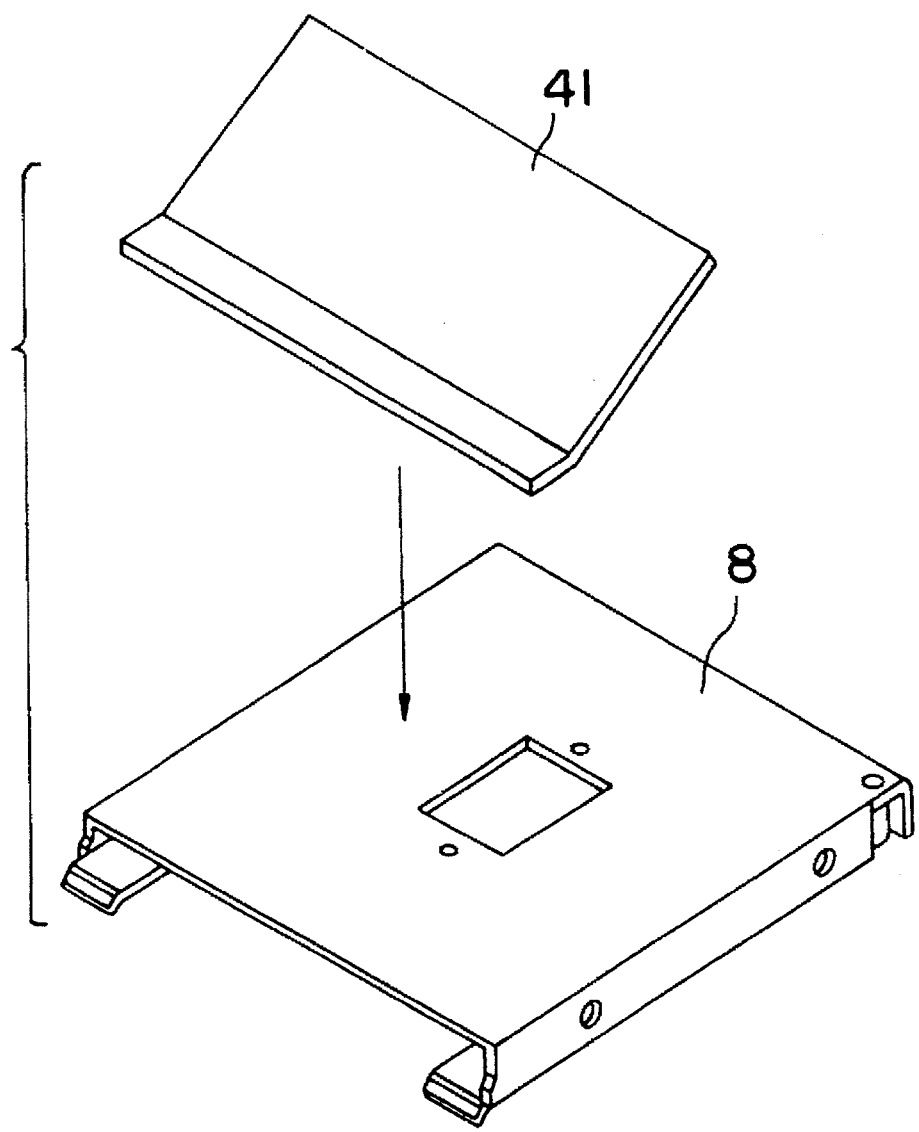
FIG. 3 is a fragmentary perspective view of the disk cartridge driving apparatus in a second embodiment of the invention.
Figure 4:
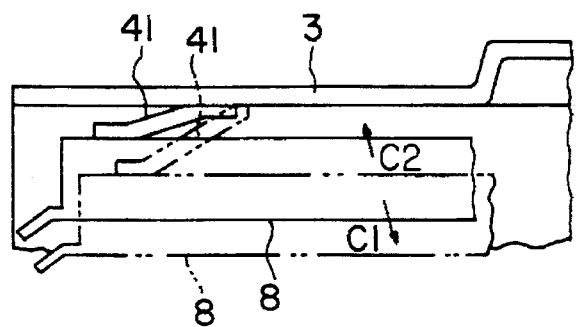
FIG. 4 is a side view of the disk cartridge driving apparatus in the second embodiment.

FIG. 3 is a fragmentary perspective view of the cartridge holder 8 and an upper partitioning plate 41 of a disk cartridge driving apparatus in a second embodiment of the invention. FIG. 4 is a side view of a portion of the disk cartridge driving apparatus in in the second embodiment. Other parts of the disk cartridge driving apparatus in the second embodiment are similar to those of the first embodiment shown in FIGS. 1 and 2. In the second embodiment, one end of upper partitioning plate 41 is attached and fixed to cartridge holder 8. Preferably, upper partitioning plate 41 is made of elastic material such as PET (polyethylene terephthalate) or PC (polycarbonate), and is bent throughout its width near the end fixed to cartridge holder 8. When cartridge holder 8 is positioned at the loading position shown by the solid lines in FIG. 4, the other end of upper partitioning plate 41 deflects and remains in resilient contact with upper cover 3. When cartridge holder 8 is positioned in the playing position shown by the dotted lines in FIG. 4, the other end of upper partitioning plate 41 stays in contact with upper cover 3.

Figure 6:
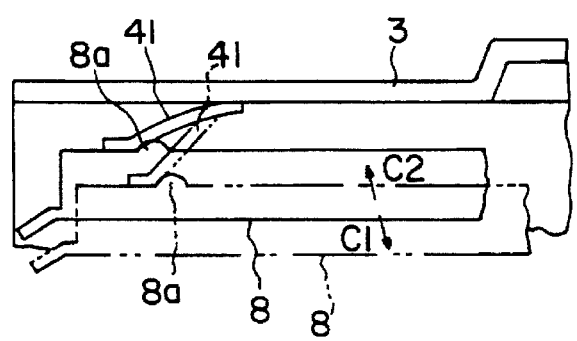
FIG. 6 is a side view of the disk cartridge driving apparatus in the third embodiment.
Figure 5:
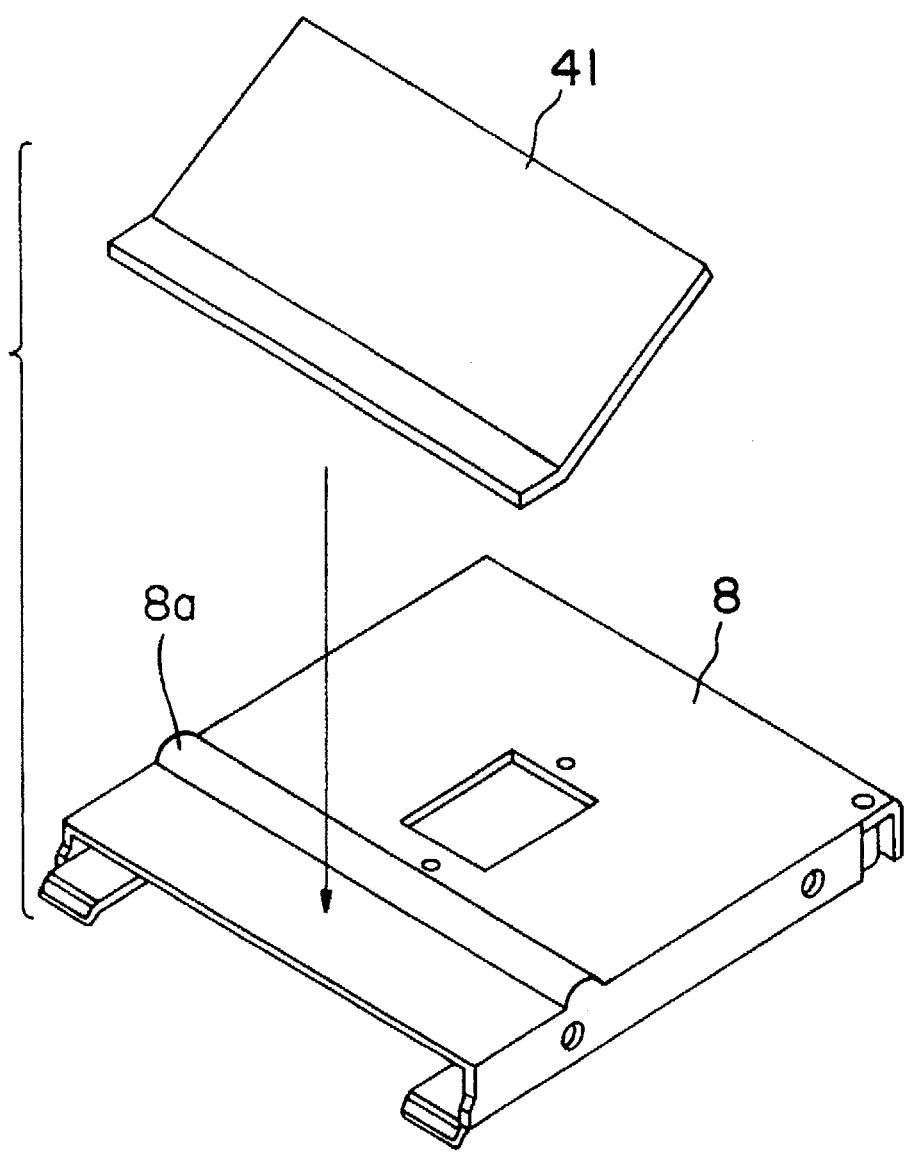
FIG. 5 is a fragmentary perspective view of the disk cartridge driving apparatus in a third embodiment of the invention.

FIG. 5 is a fragmentary perspective view of selected parts of the disk cartridge driving apparatus in a third embodiment of the invention. FIG. 6 is a side view of a protion of the disk cartridge driving apparatus in the third embodiment. Other parts of the disk cartridge driving apparatus in the third embodiment are similar to those of the second embodiment shown in FIGS. 3 and 4. In the third embodiment, cartridge holder 8 has a convex portion 8a formed throughout the width of cartridge holder 8. Preferably, the cross section of convex portion ea is shaped in the form of a semicircle.

Upper partitioning plate 41 is attached and fixed to cartridge holder 8 at a point near convex portion 8a of upper partitioning plate 41 and is in resilient contact with convex portion 8a. Preferably, upper partitioning plate 41 is made of elastic material such as PET (polyethylene terephthalate) or PC (polycarbonate), and is bent from a point near the resilient contact with convex portion 8a to the end of upper partitioning plate 41 fixed to cartridge holder 8. When cartridge holder 8 is positioned at the loading position shown by the solid lines in FIG. 6, the other end of upper partitioning plate 41 deflects and remains in resilient contact with upper cover 3. When cartridge holder 8 is positioned in the playing position shown by the dotted lines in FIG. 6, the other end of upper partitioning plate 41 stays in contact with upper cover 3.

Figure 8:
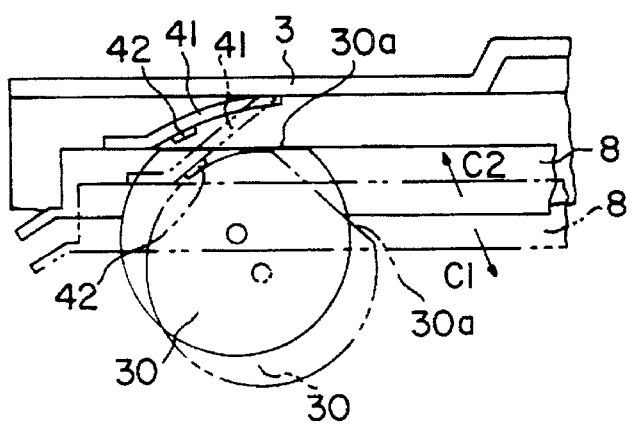
FIG. 8 is a side view of the disk cartridge driving apparatus in the fourth embodiment.
Figure 7:
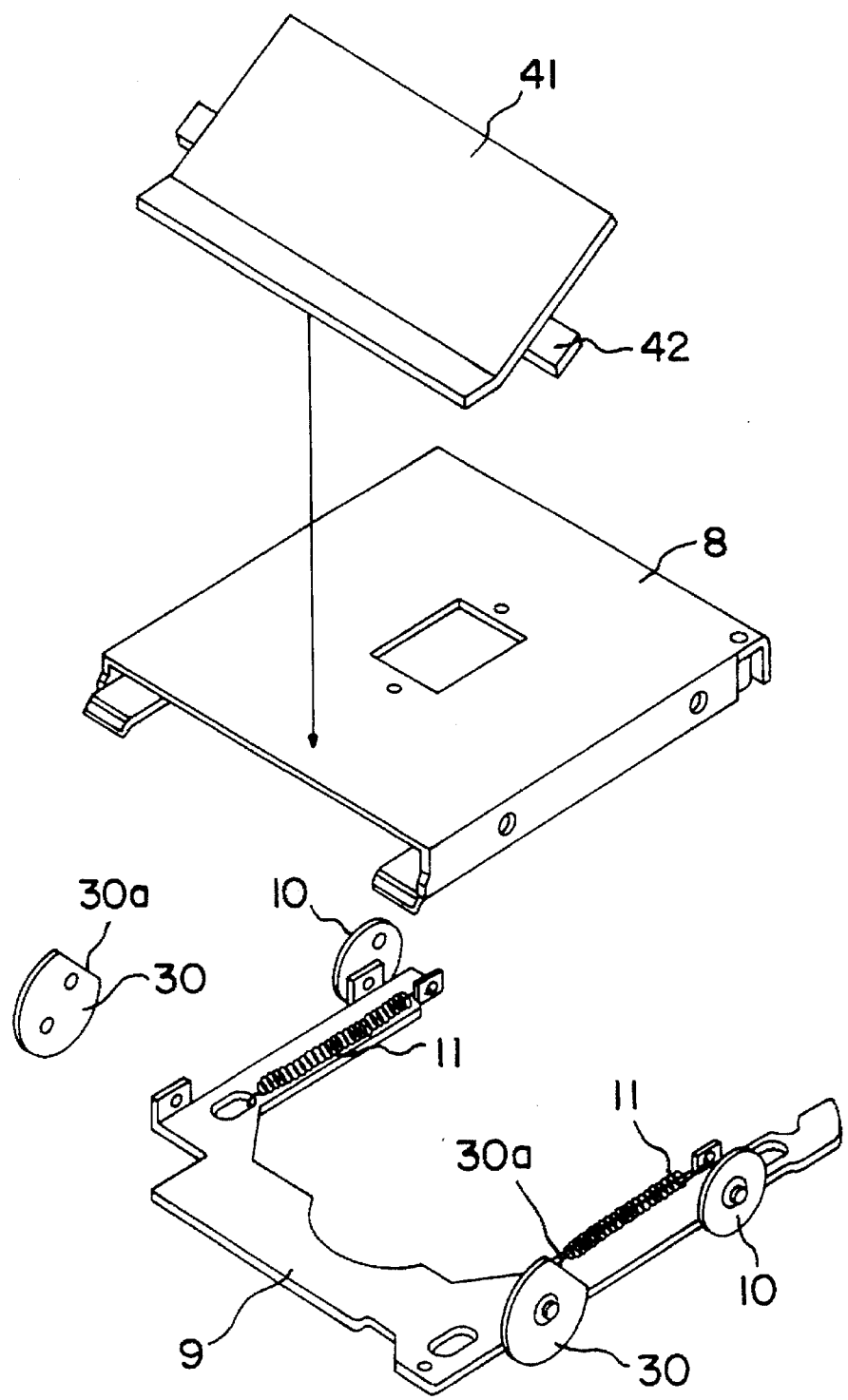
FIG. 7 is a fragmentary perspective view of the disk cartridge driving apparatus in a fourth embodiment of the invention.

FIG. 7 is a fragmentary perspective view of selected parts of the disk cartridge driving apparatus in a fourth embodiment of the invention. FIG. 8 is a side view of a portion of the disk cartridge driving apparatus in the fourth embodiment. Other parts of the disk cartridge driving apparatus in the fourth embodiment are similar to those of the second embodiment shown in FIGS. 3 and 4. In the fourth embodiment, a reinforcing plate 42 reinforces upper partitioning plate 41 on the lower surface thereof. Reinforcing plate 42 is wider than upper partitioning plate 41 and contacts a pair of cams 30 having flat notches 30a on the circumference thereof. Cams 30 do not come into contact with upper partitioning plate 41.

When cartridge holder 8 is in the loading position shown by the solid lines in FIG. 8, flat notches 30a are positioned to contact the lower surface of reinforcing plate 42. The other end of upper partitioning plate 41 is in resilient contact with upper cover 3. When cartridge holder 8 is in the playing position, a curved part of the circumference of cams 30 contacts the lower surface of reinforcing plate 42. Cams 30 thereby push up on reinforcing plate 42 and the other end of upper partitioning plate 41 stays in resilient contact with upper cover 3.

It is possible that in addition to, or in conjuction with, the above described embodiments, the upper partitioning plate 41 may be stuck on or adhered to upper cover 3 or loading base 2 and charged with electricity while the cartridge holder 8 is insulated. Tape or some similar substance may be stuck on upper partitioning plate 41, cartridge holder 8, upper cover 3, and/or loading base 2.

Although specific embodiments of the invention have been completely described herein, the appended claims are not to be thus limited but are to be construed as embodying all modifications and alternative constructions that may occur to one skilled in the art which fairly fall within the basic teaching herein set forth.

We claim:

1. A disc drive for a disk cartridge containing a record disk comprising:
   a loading base and a cover defining therebetween a substantially enclosed space except for a front opening into said space;

a door mounted to selectively close the front opening;

a cartridge holder mounted in said enclosed space to move between a loading position in which said holder is aligned with said front opening for the insertion therethrough into the holder of a cartridge containing a record disk and a playing position in which information in a record disk in a cartridge inserted into the holder is accessible;

wherein said holder in one of said positions is closer to the cover than in the other position, and wherein in each position the holder is spaced from the cover; and a first resilient partitioning member engaging at all times a front portion of said holder and a portion of said cover and changing shape as needed with movement of the cartridge holder between said loading and playing positions to block movement of dust to said cartridge and record disk through space between the holder and said cover.

2. A disc drive as in claim 1 in which said cartridge holder is spaced from said loading base when the cartridge holder is in at least one of said loading and playing positions, and including a second resilient partitioning member extending at all times between said holder and said loading base and changing shape as needed with movement of the cartridge holder between said loading and playing positions to block movement of dust to said cartridge and record disk through space between the holder and said base.

3. A disc drive as in claim 2 in which one side of said second partitioning member is secured to one of said cartridge holder and said loading base and an opposite side of the second partitioning member is in resilient contact with the other of said cartridge holder and said loading base.

4. A disc drive as in claim 3 in which one side of said first partitioning member is secured to one of said cartridge holder and said cover and an opposite side of the first partitioning member is in resilient contact with the other of said cartridge holder and said cover.

5. A disc drive as in claim 3 in which one side of said first partitioning member is secured to said cover while an opposite side of the first partitioning member is in resilient contact with said cartridge holder.

6. A disc drive as in claim 3 in which one side of said second partitioning member is secured to said loading base while an opposite side of the second partitioning member is in resilient contact with said cartridge holder.

7. A disc drive as in claim 1, further comprising an optical head to record and reproduce data on said record disk in the playing position and an optical head driving mechanism for moving the optical head in the playing position.

8. A disc drive as in claim 1 in which said first resilient partitioning member expands away from said cover when the cartridge holder moves from the loading position to the playing position and compresses toward the cover when the cartridge holder moves from the playing position to the loading position.

9. A method of keeping dust from a disk cartridge containing a record disk comprising:

providing a loading base and a cover defining therebetween a substantially enclosed space except for a front opening into said space, and a door mounted to selectively close the front opening;

mounting a cartridge holder in said enclosed space to move between a loading position in which said holder is aligned with said front opening for the insertion therethrough into the holder of a cartridge containing a record disk and a playing position in which information in a record disk in a cartridge inserted into the holder is accessible;

wherein said holder in one of said positions is closer to the cover than in the other position, and wherein in each position the holder is spaced from the cover; and utilizing a first resilient partitioning member engaging at all times a front portion of said holder and a portion of said cover and changing shape as needed to block movement of dust to said cartridge and record disk through the space between the holder and said cover.

10. A method as in claim 9 in which said holder is spaced from said loading base when the holder is in at least one of said loading and playing positions, and including the step of utilizing a second resilient partitioning member extending at all times between said holder and said loading base and changing shape as needed to block movement of dust to said cartridge and record disk through the space between the holder and said base.

11. A method as in claim 9 in which said utilizing step comprises compressing at least a portion of said first resilient member toward said cover when the cartridge holder moves from said playing position to said loading position.

12. A disc drive for a disk cartridge containing a record disk comprising:

a loading base and a cover defining therebetween a substantially enclosed space except for a front opening into said space;

a door mounted to selectively close the front opening;

a cartridge holder mounted in said enclosed space to move between a loading position in which said holder is aligned with said front opening for the insertion therethrough into the holder of a cartridge containing a record disk and a playing position in which information in a record disk in a cartridge inserted into the holder is accessible;

wherein said holder in one of said positions is closer to the cover than in the other position, and wherein in each position the holder is spaced from the cover; and a first resilient partitioning member secured to said cover and engaging at all times a front portion of said holder, said first resilient partitioning member expanding away from said cover when the cartridge holder moves from the loading position to the playing position and compressing toward the cover when the cartridge holder moves from the playing position to the loading position to block movement of dust to said cartridge and record disk through space between the holder and said cover.

13. A method of keeping dust from a disk cartridge containing a record disk comprising:

providing a loading base and a cover defining therebetween a substantially enclosed space except for a front opening into said space, and a door mounted to selectively close the front opening;

mounting a cartridge holder in said enclosed space to move between a loading position in which said holder is aligned with said front opening for the insertion therethrough into the holder of a cartridge containing a record disk and a playing position in which information in a record disk in a cartridge inserted into the holder is accessible;

wherein said holder in one of said positions is closer to the cover than in the other position, and wherein in each position the holder is spaced from the cover; and utilizing a first resilient partitioning member secured to said cover and engaging at all times a front portion of said holder, said first resilient partitioning member expanding away from said cover when the cartridge holder moves from the loading position to the playing position and compresses toward the cover when the cartridge holder moves from the playing position to the loading position to block movement of dust to said cartridge and record disk through the space between the holder and said cover.

* * * * *